United States Patent
Moon

(10) Patent No.: US 10,974,686 B2
(45) Date of Patent: Apr. 13, 2021

(54) SIDE AIRBAG DEVICE

(71) Applicant: Hyundai Mobis Co., Ltd., Seoul (KR)

(72) Inventor: Geon Woong Moon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 59 days.

(21) Appl. No.: 16/459,014

(22) Filed: Jul. 1, 2019

(65) Prior Publication Data

US 2020/0001819 A1     Jan. 2, 2020

(30) Foreign Application Priority Data

Jul. 2, 2018   (KR) ........................ 10-2018-0076305

(51) Int. Cl.
*B60R 21/2338* (2011.01)
*B60R 21/26* (2011.01)

(52) U.S. Cl.
CPC .......... *B60R 21/2338* (2013.01); *B60R 21/26* (2013.01)

(58) Field of Classification Search
CPC ................ B60R 21/2338; B60R 21/26; B60R 2021/23332; B60R 2021/23386; B60R 2021/23308; B60R 21/233; B60R 2021/23146; B60R 21/23138; B60R 21/207
See application file for complete search history.

(56) References Cited

U.S. PATENT DOCUMENTS

| | | | |
|---|---|---|---|
| 8,684,408 B2* | 4/2014 | Thomas | B60R 21/231 280/743.2 |
| 2012/0038137 A1* | 2/2012 | Wipasuramonton | B60R 21/18 280/733 |
| 2012/0049498 A1* | 3/2012 | Wiik | B60R 21/23138 280/743.2 |
| 2012/0091697 A1* | 4/2012 | Wiik | B60R 21/23138 280/730.2 |
| 2015/0314748 A1* | 11/2015 | Mihm | B60R 21/2338 280/730.2 |
| 2018/0118150 A1* | 5/2018 | Kwon | B60R 21/207 |
| 2019/0061675 A1* | 2/2019 | Kwon | B60R 21/233 |
| 2019/0092270 A1* | 3/2019 | Song | B60R 21/23138 |
| 2019/0092271 A1* | 3/2019 | Park | B60R 21/23138 |
| 2019/0283700 A1* | 9/2019 | Kwon | B60R 21/23138 |

* cited by examiner

*Primary Examiner* — Drew J Brown
(74) *Attorney, Agent, or Firm* — H.C. Park & Associates, PLC

(57) ABSTRACT

The disclosure relates to a side airbag device including: an inflator that discharges gas; a cushion that covers the inflator and is expanded toward a side of a passenger by the gas discharged from the inflator; and a tether that is disposed through and around the cushion and induces an upper portion of the cushion to bend when the cushion expands, thereby being able to prevent a passenger-to-passenger collision and protect even one passenger.

8 Claims, 5 Drawing Sheets

SIDE AIRBAG DEVICE

CROSS-REFERENCE TO RELATED APPLICATION

This application claims priority from and the benefit of Korean Patent Application No. 10-2018-0076305, filed on Jul. 2, 2018, which is hereby incorporated by reference for all purposes as if set forth herein.

BACKGROUND

Field

Exemplary embodiments of the present disclosure relate to a side airbag device, and more particularly, to a side airbag device that can prevent a bump of passengers and can protect a single passenger without a passenger in a side seat.

Discussion of the Background

In general, side airbags protect the sides of passengers. That is, in a car accident, an airbag cushion is inflated by gas flowing therein and the inflated airbag cushion protects a passenger moving laterally through a cushion action.

As side airbags, there are a near-side airbag that protects a passenger by expanding between the passenger and a door in a side collision and a far-side airbag that restricts movement of a passenger who is moved inward in a vehicle due to reaction of a side collision.

A far-side airbag should be kept in a constant position in an inflated state to prevent a collision between passengers, particularly, a head-to-head collision.

In the conventional art, there is a problem in that a far-side airbag is effectively used when there are two passengers on seats, but when there is only one passenger on a seat, it cannot protect well the single passenger. Therefore, it is required to solve this problem.

The above information disclosed in this Background section is only for enhancement of understanding of the background of the invention and, therefore, it may contain information that does not constitute prior art.

SUMMARY

Various embodiments are directed to a side airbag device that can a bump of passengers and can protect a single passenger without a passenger in a side seat.

In an embodiment, a side airbag device includes: an inflator that discharges gas; a cushion that covers the inflator and is expanded toward a side of a passenger by the gas discharged from the inflator; and a tether that is disposed through and around the cushion and induces an upper portion of the cushion to bend when the cushion expands.

The cushion has: a cushion expansion part that is expanded by the gas discharged from the inflator; a cushion mid-passage portion that is formed in the cushion expansion part and inducing the cushion expansion part to bend; and a cushion end-passage portion that is formed at an upper end of the cushion expansion part and through which the tether passed through the cushion mid-passage portion passes.

The cushion mid-passage portion has: a first mid-passage portion that couples both sides of the cushion expansion part; and a second mid-passage portion that couples both sides of the cushion expansion part and disposed under the first mid-passage portion, and the first mid-passage portion and the second mid-passage portion are spaced apart from each other to pass gas.

The first mid-passage portion has: a first body that couples both sides of the cushion expansion part and is disposed to face a shoulder of a passenger when the cushion expansion part finishes expanding; a first extension that extends with a predetermined curvature from the first body toward the second mid-passage portion and couples both sides of the cushion expansion part; and a first hole that is formed at the first body and through which the tether passes.

The second mid-passage portion has: a second body that couples both sides of the cushion expansion part and is disposed diagonally lower than the first body; and a second extension that extends with a predetermined curvature from the second body toward the first extension and couples both sides of the cushion expansion part.

A shortest distance between the first extension and the second extension is ¼ to ⅛ of a shortest distance from the second body to the cushion expansion part, and a shortest distance from the first body to the cushion expansion part is about 1.1 to about 1.9 of the shortest distance from the second body to the cushion expansion part.

An inclination angle of a tangential line on edges of the first body and the second body is about 5 to about 30 degrees.

The tether has: a first tether section fixed to the inflator or a lower portion of the cushion expansion part, and reaching the cushion mid-passage portion; a second tether section extending from the first tether section and reaching the cushion end-passage portion through the cushion mid-passage portion; and a third tether section extending from the second tether section and fixed to the inflator or a lower portion of the cushion expansion part to hold a passenger.

A sum of a distance from the inflator or a lower portion of the cushion expansion part to the cushion mid-passage portion, a distance from the cushion mid-passage portion to the cushion end-passage portion and a distance from the cushion end-passage portion to the inflator or a lower portion of the cushion expansion part is larger than a length of the tether.

The tether includes an elastic material to absorb shock.

In the side airbag device according to the embodiments, since the tether is disposed around the cushion, it is possible to can reduce shock energy that is applied to a passenger.

In the side airbag device according to the embodiments, since the tether is disposed through and around the cushion, it is possible to induce the cushion to bend toward a passenger.

In the side airbag device according to the embodiments, since the first mid-passage portion and the second mid-passage portion are disposed at an angle, thereby limit the bending area of the cushion expansion part. Further, since gas passes through between the first mid-passage portion and the second mid-passage portion, thereby being able to maintain the strength of the bending cushion expansion part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
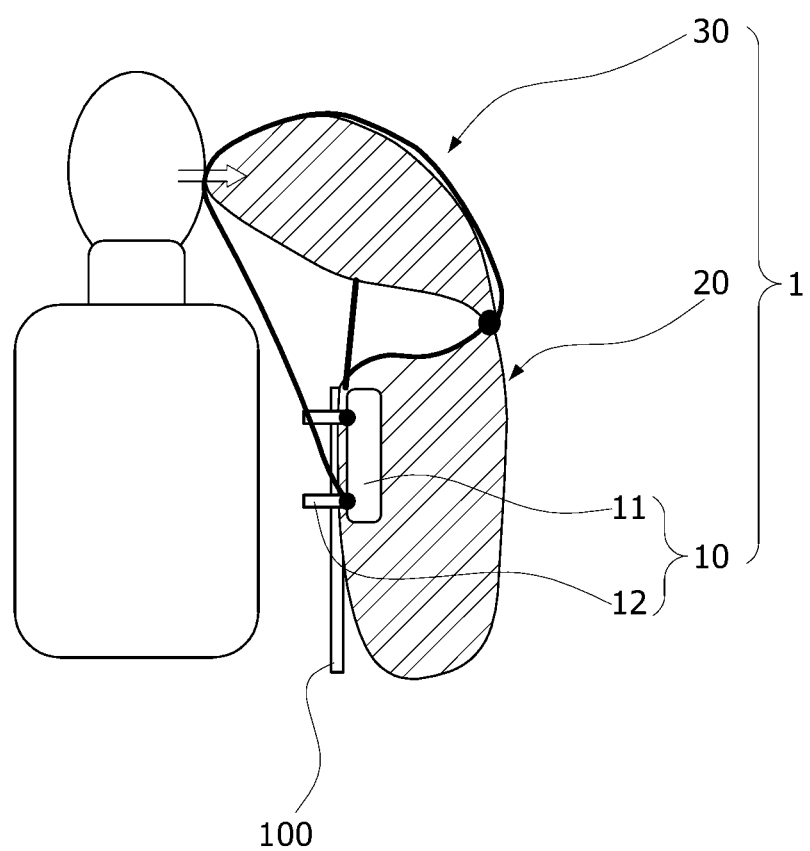
FIG. 1 is a view schematically showing a side airbag device according to an embodiment of the disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

The thicknesses of lines or sizes of components illustrated in the drawings may be exaggerated for the clarity and convenience of the following description. Further, the terminologies described below are terminologies determined in consideration of the functions in the disclosure and may be construed in different ways by the intention of users and operators or custom. Therefore, the definitions of the thereof should be construed based on the contents throughout the specification.

FIG. 1 is a view schematically showing a side airbag device according to an embodiment of the disclosure. Referring to FIG. 1, a side airbag device 1 according to an embodiment of the disclosure includes an inflator 10, a cushion 20, and a tether 30.

The inflator 10 that discharges gas may be mounted to a seat frame 100. For example, the seat frame 100 is formed of a metallic material and is covered with a seat cushion to allow a passenger to sit thereon. There are various seats including a driver's seat and a passenger seat in vehicles and the inflator 10 may be installed or may be selectively installed on the seat frame 100 corresponding to each of the seats.

The cushion 20 covers the inflator 10 and protects a side of a passenger by expanding due to the gas that is discharged from the inflator 10. For example, the cushion 20 is coupled to the inflator 10, is stowed in a folded state in a seat cushion before gas is discharged, and can inflate, tear the seat cushion, and protrude outside when the gas is discharged.

The tether 30 is disposed through and around the cushion 20 and induces the upper portion of the cushion 20 to bend, thereby reducing shock energy that is applied to a passenger. For example, both ends of the tether 30 may be fixed to the inflator 10 or the outer side of the cushion 20 and it is possible to induce the upper portion of the cushion 20 to bend by adjusting the length of the tether 30 when the cushion 20 inflates. Accordingly, the upper portion of the cushion 20 bends toward the head of a passenger, thereby being able to protect the passenger's head and neck.

The inflator 10 according to an embodiment of the disclosure may include a discharge unit 11 and a fixing portion 12. The discharge unit 11 provides gas when a car collision occurs. For example, when a car collision is sensed, a sensing signal is transmitted to the discharge unit 11, whereby gas can be discharged. The fixing portion 12 is provided for mounting the discharge unit 11 to the seat frame 100. For example, a plurality of fixing portions 12 can fix the discharge unit 11 by being bolted to the seat frame 100. In this construction, both ends of the tether 30 may be coupled to the fixing portions 12 or may be sewn to the outer side of the lower portion of the cushion 20.

Figure 2:
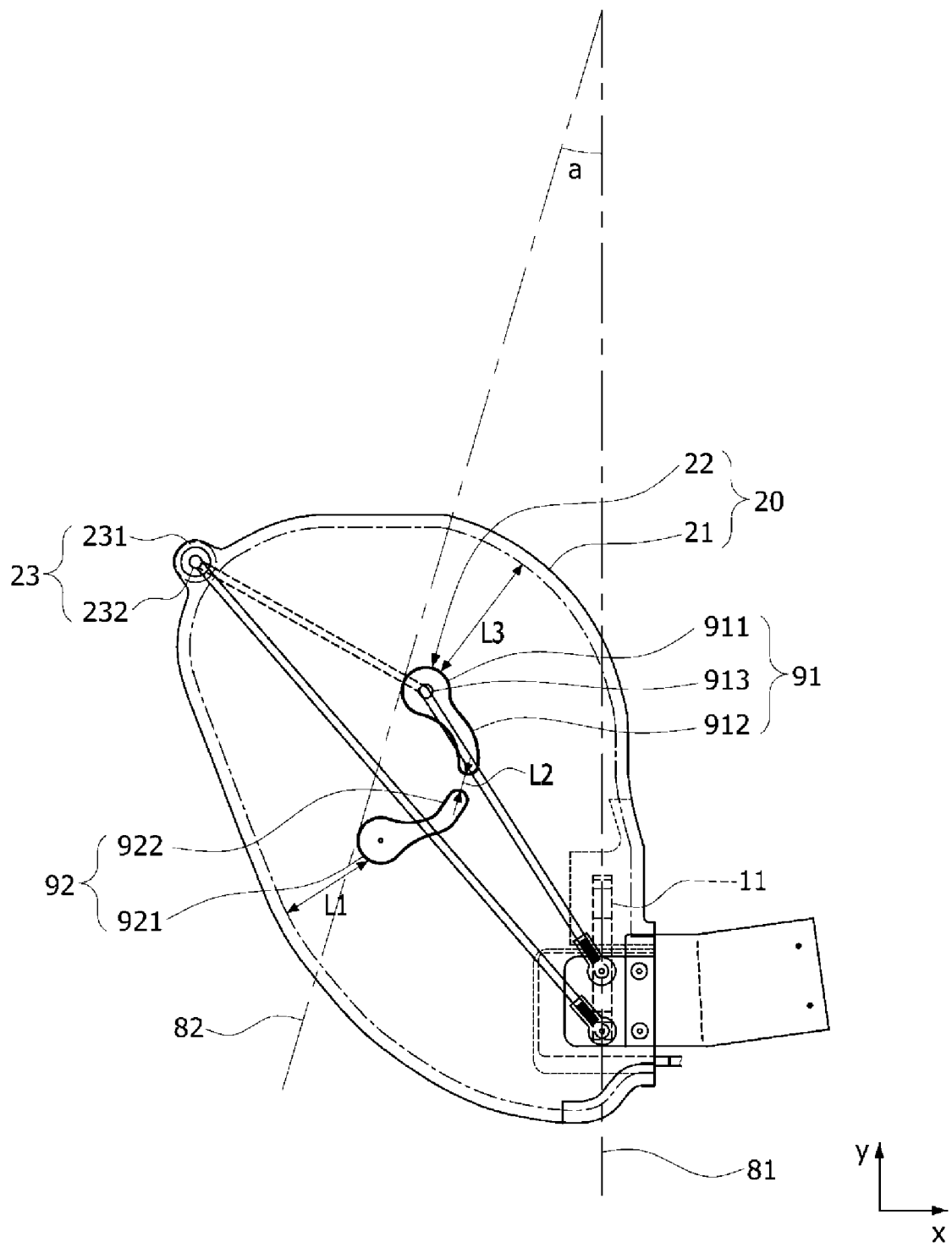
FIG. 2 is a view schematically showing a cushion of the side airbag device according to an embodiment of the disclosure.
Figure 3:
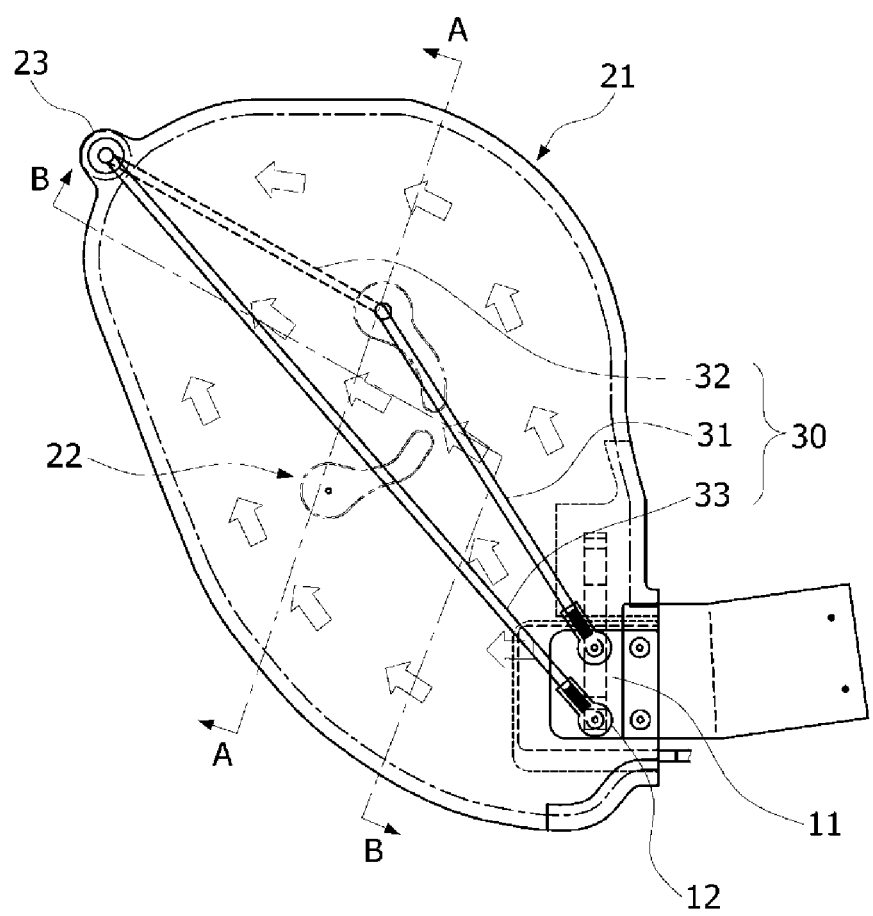
FIG. 3 is a view schematically showing gas flow in FIG. 2.
Figure 4:
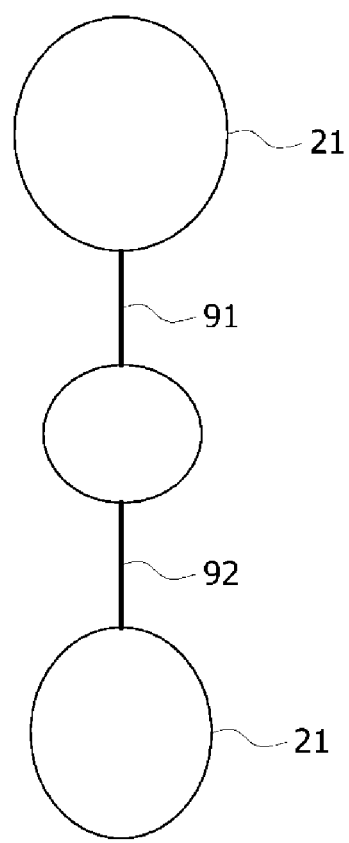
FIG. 4 is a cross-sectional view taken along line A-A of FIG. 3.
Figure 5:
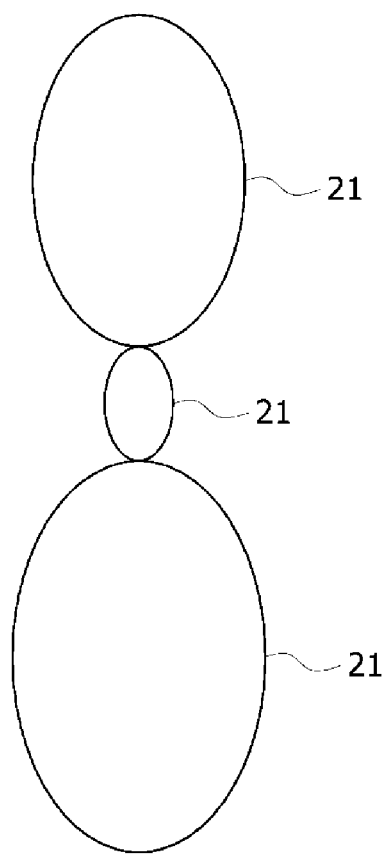
FIG. 5 is a cross-sectional view taken along line B-B of FIG. 3.

FIG. 2 is a view schematically showing a cushion of the side airbag device according to an embodiment of the disclosure. FIG. 3 is a view schematically showing gas flow in FIG. 2, FIG. 4 is a cross-sectional view taken along line A-A of FIG. 3, and FIG. 5 is a cross-sectional view taken along line B-B of FIG. 3.

Referring to FIGS. 2 to 5, the cushion 20 according to an embodiment of the disclosure may have a cushion expansion part 21, a cushion mid-passage portion 22, and a cushion end-passage portion 23.

The cushion expansion part 21 is expanded by the gas discharged from the inflator 10, thereby being positioned at a side of a passenger. For example, the cushion expansion part 21 may expand in a state coupled to the discharge unit 11. Alternatively, the cushion expansion part 21 may expand in a state coupled to the seat frame 100. A pair of cushion expansion parts 21 may be sewn along the edges and can be inflated by the gas discharged from the inflator 10.

The cushion mid-passage portion 22 is formed on the cushion expansion part 21 and induces bending of the cushion expansion part 21. For example, the cushion mid-passage portion 22 may be formed at a position corresponding to the shoulder of a passenger when the cushion expansion part 21 finishes expanding. The cushion expansion part 21 formed between the cushion mid-passage portion 22 and the cushion end-passage portion 23 can protect the head of a passenger by protruding toward the passenger's head.

The cushion end-passage portion 23 is formed at the upper end of the cushion expansion part 21 and the tether 30 passes through the cushion end-passage portion 23. For example, the cushion end-passage portion 23 may have a bonded portion 231 formed at the upper end of the cushion expansion part 21 and bonded such that gas does not flow inside and a through-hole 232 formed at the bonded portion 231 such that the tether 30 passes therethrough.

The cushion mid-passage portion 22 according to an embodiment of the disclosure has a first mid-passage portion 91 and a second mid-passage portion 92. The first mid-passage portion 91 and the second mid-passage portion 92 couple both sides of the cushion expansion part 21. The first mid-passage portion 91 is disposed higher than the second mid-passage portion 92, and the first mid-passage portion 91 and the second mid-passage portion 92 are spaced apart from each other to pass gas. For example, the first mid-passage portion 91 and the second mid-passage portion 92 do not pass gas because both sides of the cushion expansion part 21 are sewn at the portions, but gas can pass through the space between the first mid-passage portion 91 and the second mid-passage portion 92. Accordingly, the strength of the cushion expansion part 21 that bends around the first mid-passage portion 91 and the second mid-passage portion 92 can be maintained.

The first mid-passage portion 91 according to an embodiment of the disclosure has a first body 911, a first extension 912, and a first hole 913.

The first body 911 couples both sides of the cushion expansion part 21 and is disposed to face the shoulder of a passenger when the cushion expansion part 21 finishes expanding. For example, the first body 911 may be formed in a circular shape by sewing the cushion expansion part 21 and can be placed on the shoulder of a passenger when the cushion expansion part 21 finishes expanding.

The first extension 912 extends with a predetermined curvature from the first body 911 toward the second mid-passage portion 92 and couples both sides of the cushion expansion part 21. For example, the first extension 912 may couple both sides of the cushion expansion part 21 in the same way as the first body 911. The first extension 912 may bend partially or entirely toward the second mid-passage portion 92.

The first hole 913 is formed at the first body 911 and the tether 30 passes through the first hole 913. For example, the first hole 913 is formed at the center of the first body 911 and can allow the tether 30 to pass through.

The second mid-passage portion 92 according to an embodiment of the disclosure has a second body 921 and a second extension 922.

The second body 921 couples both sides of the cushion expansion part 21 and is disposed diagonally lower than the first body 911. For example, the cushion expansion part 21 may be sewn such that the second body 921 is formed in a circular shape.

The second extension 922 extends with a predetermined curvature from the second body 921 toward the first mid-passage portion 91 and couples both sides of the cushion expansion part 21. For example, the second extension 922 may couple both sides of the cushion expansion part 21 in the same way as the second body 921. The second extension 922 may bend partially or entirely toward the first mid-passage portion 91.

The shortest distance L2 between the first extension 912 and the second extension 922 may be ¼ to ⅛ of the shortest distance L1 from the second body 921 to the edge of the cushion expansion part 21. Accordingly, a gas passage can be secured between the first extension 912 and the second extension 922. If the gas passage between the first extension 912 and the second extension 922 is excessively set, the cushion expansion part 21 may not smoothly expand upward.

The shortest distance L3 from the first body 911 to the edge of the cushion expansion part 21 may be 1.1 to 1.9 of the shortest distance L1 from the second body 921 to the edge of the cushion expansion part 21. When the gas passage is secured from the first body 911 to the edge of the cushion expansion part 21, upward expansion of the cushion expansion part 21 can be secured.

On the other hand, the inclination angle (a) of a tangential line on the edges of the first body 911 and the second body 921 is set as about 5 to about 30 degrees. That is, in FIG. 2, a first line 81 may be a vertical line that is perpendicular to the x-axis, a second line 82 may be a tangential line passing through contact points on the first body 911 and the second body 921, and the inclination angle (a) made by the first line 81 and the second line 82 may be set on the basis of a vehicle pulse or a seat angle. If the inclination angle (a) is smaller than a set value, the upper portion of the cushion expansion part 21 expands toward the back of the head of a passenger, so it is difficult to stably protect the head. Further, if the inclination angle (a) is larger than the set value, the upper portion of the cushion expansion part 21 expands toward the face of a passenger, so it is difficult to stably protect the head. The second line 82 may be the folding portion of the cushion expansion part 21.

The tether 30 according to an embodiment of the disclosure has a first tether section 31, a second tether section 32, and a third tether section 33. For example, the tether 30 may be a single band and may include an elastic material to absorb shock. Further, the tether 30 may include a soft material to prevent an injury of a passenger due to direct contact with the passenger.

The first tether section 31 is fixed to the lower portion of the cushion expansion part 21 or the fixing portion 12 of the inflator 10 and reaches the cushion mid-passage portion 22. The second tether section 32 extends from the first tether section 31 and reaches the cushion end-passage portion 23 through the cushion mid-passage portion 22. The third tether section 33 extends from the second tether section 32 and is fixed to the lower portion of the cushion expansion part 21 or the fixing portion 12 of the inflator 10 through the cushion end-passage portion 23. The third tether section 33 supports a passenger.

For example, when the cushion expansion part 21 expands, it can be divided into an inner side facing a passenger and an outer side that is the opposite side. In this state, the first tether section 31 is coupled at an end to the fixing portion 12 or the lower end of the cushion expansion part 21, is disposed along the inner side of the cushion expansion part 21, and can reach the cushion mid-passage portion 22. The second tether section 32 may pass through the cushion mid-passage portion 22 and may be disposed along the outer side of the cushion expansion part 21. The third tether section 33 may pass through the cushion end-passage portion 23 and may be disposed along the inner side of the cushion expansion part 21. An end of the third tether section 33 may be coupled to the fixing portion 12 or the lower end of the cushion expansion part 21.

The installation path of the tether 30 is longer than the actual length of the tether 30. In more detail, when the length of the tether 30 is D, the (shortest) distance from the fixing portion 12 or the lower end of the cushion expansion part 21 to the cushion mid-passage portion 22 is A, the (shortest) distance from the cushion mid-passage portion 22 to the cushion end-passage portion 23 is B and the (shortest) distance from the cushion end-passage portion 23 to the fixing portion 12 or the lower end of the cushion expansion part 21 is C, A+B+C>D is satisfied. Accordingly, when the cushion expansion part 21 finishes expanding, the cushion expansion part 21 formed over the cushion mid-passage portion 22 can bend toward a passenger and tension is generated in the tether 30.

The operation of the side airbag device 1 having the above construction according to an embodiment of the disclosure is described hereafter.

When gas is discharged from the inflator 10 due to a car collision, the cushion 20 expands. In this process, the tether 30 passes through the cushion mid-passage portion 22 and supports the outer side of the cushion expansion part 21 while passing through the cushion end-passage portion 23. That is, the first tether section 31 is disposed on the inner side of the cushion expansion part 21, the second tether section 32 is disposed on the outer side of the cushion expansion part 21, and the third tether section 33 is disposed on the inner side of the cushion expansion part 21. When the length of the tether 30 is smaller than the installation path of the tether 30, the upper end of the cushion expansion part 21 keeps bent toward the head of a passenger when the cushion expansion part 21 expands.

Meanwhile, the first mid-passage portion 91 and the second mid-passage portion 92 are disposed at an angle, and the cushion expansion part 21 bends toward the head of a passenger along the tangential line of the first mid-passage portion 91 and the second mid-passage portion 92.

The gas discharged from the inflator 10 can pass through between the first mid-passage portion 91 and the second mid-passage portion 92 and provide strength to the bending area of the cushion expansion part 21.

In the side airbag device 1 according to an embodiment of the disclosure, the tether 30 is disposed around the cushion 20, so it is possible to reduce shock energy that is applied to a passenger.

In the side airbag device 1 according to an embodiment of the disclosure, the tether 30 can be disposed through and around the cushion 20, thereby being able to induce the upper portion of the cushion 20 to bend toward a passenger.

In the side airbag device 1 according to an embodiment of the disclosure, the first mid-passage portion 91 and the second mid-passage portion 92 are disposed at an angle, thereby being able to limit the bending area of the cushion expansion part 21. Further, since gas passes through between the first mid-passage portion 91 and the second mid-passage portion 92, thereby being able to maintain the strength of the bending cushion expansion part 21.

Although the disclosure has been described with reference to the exemplary embodiments illustrated in the drawings, those are only examples and may be changed and modified into other equivalent exemplary embodiments from the disclosure by those skilled in the art. Therefore, the technical protection scope of the disclosure should be determined by the following claims.

What is claimed is:

1. A side airbag device comprising:
   an inflator configured to discharge gas;
   a cushion that covers the inflator and is expanded toward a side of a passenger by the gas discharged from the inflator; and
   a tether that is disposed through and around the cushion and configured to induce an upper portion of the cushion to bend when the cushion expands,
   wherein:
   the cushion has:
      a cushion expansion part that is expanded by the gas discharged from the inflator;
      a cushion mid-passage portion that is formed in the cushion expansion part and configured to induce the cushion expansion part to bend; and
      a cushion end-passage portion that is formed at an upper end of the cushion expansion part, and the tether is configured to pass through both the cushion mid-passage portion and the cushion end-passage portion; and
   the cushion mid-passage portion comprises:
      a first mid-passage portion configured to couple both sides of the cushion expansion part; and
      a second mid-passage portion configured to couple both sides of the cushion expansion part and disposed under the first mid-passage portion, and
      the first mid-passage portion and the second mid-passage portion are spaced apart from each other to pass gas.

2. The side airbag device of claim 1, wherein the first mid-passage portion comprises:
   a first body configured to couple both sides of the cushion expansion part and is disposed to face a shoulder of a passenger when the cushion expansion part finishes expanding;
   a first extension that extends with a predetermined curvature from the first body toward the second mid-passage portion and configured to couple both sides of the cushion expansion part; and
   a first hole that is formed at the first body and through which the tether passes.

3. The side airbag device of claim 2, wherein the second mid-passage portion comprises:
   a second body configured to couple both sides of the cushion expansion part and is disposed diagonally lower than the first body; and
   a second extension that extends with a predetermined curvature from the second body toward the first extension and configured to couple both sides of the cushion expansion part.

4. The side airbag device of claim 3,
   wherein a shortest distance between the first extension and the second extension is about ¼ to about ⅛ of a shortest distance from the second body to the cushion expansion part, and
   wherein a shortest distance from the first body to the cushion expansion part is about 1.1 to about 1.9 of the shortest distance from the second body to the cushion expansion part.

5. The side airbag device of claim 3, wherein an inclination angle of a tangential line on edges of the first body and the second body is about 5 to about 30 degrees.

6. A side airbag device comprising:
   an inflator configured to discharge gas;
   a cushion that covers the inflator and is expanded toward a side of a passenger by the gas discharged from the inflator; and
   a tether that is disposed through and around the cushion and configured to induce an upper portion of the cushion to bend when the cushion expands,
   wherein:
   the cushion has:
      a cushion expansion part that is expanded by the gas discharged from the inflator;
      a cushion mid-passage portion that is formed in the cushion expansion part and configured to induce the cushion expansion part to bend; and
      a cushion end-passage portion that is formed at an upper end of the cushion expansion part, and the tether is configured to pass through both the cushion mid-passage portion and the cushion end-passage portion; and
   the tether comprises:
      a first tether section fixed to the inflator or a lower portion of the cushion expansion part, and configured to reach the cushion mid-passage portion;
      a second tether section configured to extend from the first tether section and to reach the cushion end-passage portion through the cushion mid-passage portion; and
      a third tether section configured to extend from the second tether section and to be fixed to the inflator or a lower portion of the cushion expansion part to support a passenger.

7. The side airbag device of claim 6, wherein a sum of a distance from the inflator or a lower portion of the cushion expansion part to the cushion mid-passage portion, a distance from the cushion mid-passage portion to the cushion end-passage portion and a distance from the cushion end-passage portion to the inflator or a lower portion of the cushion expansion part is larger than a length of the tether.

8. The side airbag device of claim 6, wherein the tether comprises an elastic material to absorb shock.

* * * * *